United States Patent
Yamamoto

(10) Patent No.: US 12,515,627 B2
(45) Date of Patent: Jan. 6, 2026

(54) BRAKING CONTROL DEVICE FOR VEHICLE

(71) Applicant: ADVICS CO., LTD., Kariya (JP)

(72) Inventor: Yusaku Yamamoto, Kariya (JP)

(73) Assignee: ADVICS CO., LTD., Kariya (JP)

(*) Notice: Subject to any disclaimer, the term of this patent is extended or adjusted under 35 U.S.C. 154(b) by 129 days.

(21) Appl. No.: 18/547,351

(22) PCT Filed: Mar. 29, 2022

(86) PCT No.: PCT/JP2022/015615
§ 371 (c)(1),
(2) Date: Aug. 22, 2023

(87) PCT Pub. No.: WO2022/210751
PCT Pub. Date: Oct. 6, 2022

(65) Prior Publication Data
US 2024/0132035 A1 Apr. 25, 2024
US 2024/0227761 A9 Jul. 11, 2024

(30) Foreign Application Priority Data

Mar. 29, 2021 (JP) ................................ 2021-055685

(51) Int. Cl.
*B60T 8/88* (2006.01)
*B60T 8/171* (2006.01)
(Continued)

(52) U.S. Cl.
CPC .............. *B60T 8/885* (2013.01); *B60T 8/171* (2013.01); *B60T 8/172* (2013.01);
(Continued)

(58) Field of Classification Search
CPC .......... B60T 8/885; B60T 8/171; B60T 8/172; B60T 8/17551; B60T 8/58; B60T 8/92;
(Continued)

(56) References Cited

U.S. PATENT DOCUMENTS 5,566,094 A * 10/1996 Kojima ................. B60T 8/1769
702/148
5,948,035 A * 9/1999 Tomita .................... B60T 8/172
701/79

(Continued)

FOREIGN PATENT DOCUMENTS

JP 2016028913 A 3/2016

OTHER PUBLICATIONS

International Search Report (PCT/ISA/210) with English translation and Written Opinion (PCT/ISA/237) mailed on Jun. 21, 2022, by the Japanese Patent Office as the International Searching Authority for International Application No. PCT/JP2022/015615.

*Primary Examiner* — Phutthiwat Wongwian
*Assistant Examiner* — Brian R Kirby
(74) *Attorney, Agent, or Firm* — BUCHANAN INGERSOLL & ROONEY PC

(57) ABSTRACT

A vehicle which adopts a control device as a braking control device includes a sensor that acquires a rotation angle of a wheel. The control device includes a first distance calculation unit, a second distance calculation unit, and a braking control unit. The first distance calculation unit sets a braking force corresponding to a braking operation member operation amount as a reference braking force, estimates vehicle longitudinal acceleration based on the reference braking force, and calculates a braking force reference distance estimating a moving distance until the vehicle stops based on the longitudinal acceleration. The second distance calculation unit calculates a wheel reference distance estimating the vehicle moving distance based on a detection signal of the sensor and a wheel diameter. The braking control unit executes feedback control for controlling the vehicle braking force so that a difference between the braking force reference distance and the wheel reference distance decreases.

7 Claims, 5 Drawing Sheets

(51) Int. Cl.
  *B60T 8/172* (2006.01)
  *B60T 8/1755* (2006.01)
  *B60T 8/58* (2006.01)
  *B60T 8/92* (2006.01)

(52) U.S. Cl.
  CPC ............ *B60T 8/17551* (2013.01); *B60T 8/58* (2013.01); *B60T 8/92* (2013.01); *B60T 2220/04* (2013.01); *B60T 2230/04* (2013.01); *B60T 2240/00* (2013.01); *B60T 2250/00* (2013.01); *B60T 2250/04* (2013.01); *B60T 2270/82* (2013.01)

(58) Field of Classification Search
  CPC ............ B60T 2220/04; B60T 2230/04; B60T 2240/00; B60T 2250/00; B60T 2250/04; B60T 2270/82; B60T 8/88
  See application file for complete search history.

(56) References Cited

U.S. PATENT DOCUMENTS

| | | | | |
|---|---|---|---|---|
| 6,030,056 | A * | 2/2000 | Sawada | B60T 8/4872 303/113.5 |
| 10,189,453 | B2 * | 1/2019 | Payne | B60T 8/172 |
| 2004/0167692 | A1 * | 8/2004 | Lu | B60T 8/172 280/5.502 |
| 2007/0173984 | A1 * | 7/2007 | Nakayama | B60T 13/74 701/1 |
| 2007/0174002 | A1 * | 7/2007 | Kitazaki | B60T 8/172 701/70 |
| 2010/0114449 | A1 * | 5/2010 | Shiozawa | B62D 6/005 701/90 |
| 2011/0118948 | A1 * | 5/2011 | Ohbayashi | B60T 8/172 701/70 |
| 2012/0083983 | A1 * | 4/2012 | Danz | G08G 1/165 701/70 |
| 2012/0239266 | A1 * | 9/2012 | Kato | B60W 10/188 701/70 |
| 2013/0116874 | A1 * | 5/2013 | Ichinose | B60L 15/20 701/22 |
| 2015/0224978 | A1 * | 8/2015 | Shimizu | B60T 8/58 701/70 |
| 2017/0259795 | A1 * | 9/2017 | Das | B60W 30/17 |
| 2017/0305396 | A1 * | 10/2017 | Shiratsuchi | B61L 23/14 |
| 2018/0099648 | A1 * | 4/2018 | Won | B60T 8/172 |
| 2018/0345930 | A1 * | 12/2018 | Yasui | B60T 8/72 |
| 2020/0223407 | A1 * | 7/2020 | Yasui | G05D 1/0257 |

* cited by examiner

PEDAL STROKE BP

LONGITUDINAL ACCELERATION AS

VEHICLE BODY SPEED VS

TRAVELING DISTANCE

TARGET BRAKING FORCE BFT

PEDAL STROKE BP

LONGITUDINAL ACCELERATION AS

VEHICLE BODY SPEED VS

TRAVELING DISTANCE

TARGET BRAKING FORCE BFT

PEDAL STROKE BP

LONGITUDINAL ACCELERATION AS

VEHICLE BODY SPEED VS

TRAVELING DISTANCE

TARGET BRAKING FORCE BFT

BRAKING CONTROL DEVICE FOR VEHICLE

TECHNICAL FIELD

The disclosure relates to a braking control device for a vehicle.

BACKGROUND ART

PTL 1 discloses a control device that controls a braking force when a vehicle stops. The control device defines a control timing based on a vehicle speed during deceleration.

CITATION LIST

Patent Literature

PTL 1: JP2016-28913A

SUMMARY

Technical Problem

For example, a rotation angle of a wheel based on a detection signal from a wheel speed sensor may be used to calculate a vehicle speed. The detection signal from the wheel speed sensor includes pulses generated at intervals according to the rotation speed of the wheel. The interval of pulses included in the detection signal increases in a region in which the vehicle speed is low, such as immediately before the wheels stop rotating. Here, the wheel speed is calculated as a value obtained by first-order differentiation of the rotation angle. Therefore, the difference between the calculated wheel speed and the actual wheel speed is more likely to increase as the interval of pulses increases. That is, there is a problem that the accuracy of the calculated wheel speed becomes low and the accuracy of the calculated vehicle speed becomes low.

In this way, the vehicle speed may be calculated as a value different from the actual vehicle speed due to a decrease in the detection accuracy of the vehicle speed. In the control device such as PTL 1 that defines the control timing of the braking force based on the vehicle speed, when the calculated vehicle speed differs from the actual vehicle speed, there is a concern that the control accuracy may deteriorate.

Solution to Problem

A braking control device for a vehicle for solving the above-described problems is a braking control device for a vehicle applied to a vehicle with a sensor capable of acquiring a rotation angle of a wheel, including: a first distance calculation unit which sets a braking force corresponding to an operation amount of a braking operation member by a driver of the vehicle as a reference braking force, uses a longitudinal acceleration of the vehicle estimated to decrease as the reference braking force decreases, and calculates a braking force reference distance estimating a moving distance of the vehicle until the vehicle stops based on the longitudinal acceleration; a second distance calculation unit which calculates a wheel reference distance estimating the moving distance of the vehicle based on a detection signal of the sensor and a diameter of the wheel; and a braking control unit which executes feedback control of controlling the braking force applied to the vehicle so that a difference between the braking force reference distance and the wheel reference distance decreases.

According to the above-described configuration, it is possible to control the braking force applied to the vehicle by estimating the moving distance of the vehicle based on the detection signal from the sensor. That is, it is possible to control the braking force without using the vehicle speed calculated based on the detection signal from the sensor. Compared to the vehicle speed calculated as the speed based on the detection signal from the sensor, the wheel reference distance calculated as described above can reduce the low accuracy of the actual value. Therefore, even in a situation in which the detection accuracy of the vehicle speed is low, it is possible to reduce the influence on the accuracy of controlling the braking force.

DESCRIPTION OF EMBODIMENTS

Hereinafter, an embodiment of a braking control device for a vehicle will be described with reference to FIGS. 1 to 7E.

Figure 1:
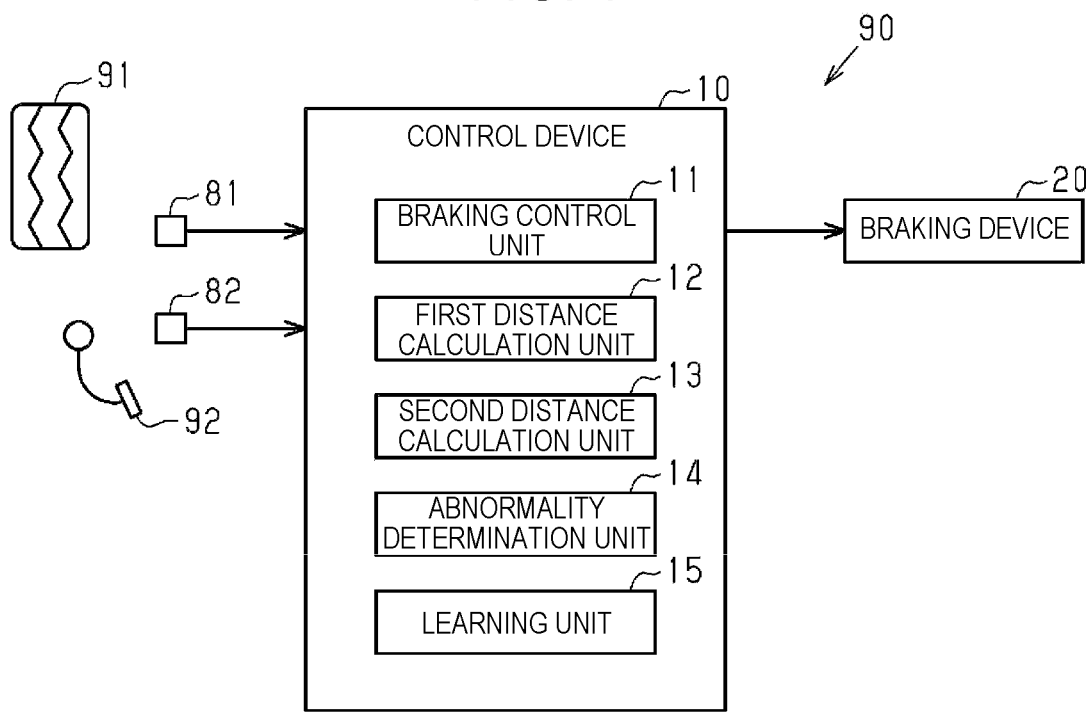
FIG. 1 is a block diagram showing an embodiment of a braking control device for a vehicle and a vehicle including the braking control device.

FIG. 1 shows a control device 10 serving as the braking control device for the vehicle and a vehicle 90. The vehicle 90 includes a braking device 20 which applies a braking force to wheels 91. The control device 10 sets the braking device 20 as a target to be controlled. A braking operation member 92 that is operable by a driver is attached to the vehicle 90. An example of the braking operation member 92 is a brake pedal. Further, the vehicle 90 includes a driving device which transmits a driving force to drive wheels of the wheels 91.

<Driving Device>

The driving device of the vehicle 90 includes an internal combustion engine as a power source. The power source of the driving device is not limited to the internal combustion engine. For example, an electric motor may be mounted as the power source. As the driving device, one including the internal combustion engine and the electric motor as the power source may be adopted. An in-wheel motor in which the electric motor is attached to each wheel 91 as the power source can also be used as the driving device.

<Braking Device>

An example of the braking device 20 is a frictional braking device which generates a frictional braking force. The braking device 20 may be a regenerative braking device which generates a regenerative braking force. As the braking device 20, a braking device capable of cooperatively controlling the frictional braking force and the regenerative braking force by means of the frictional braking device and the regenerative braking device can also be adopted.

<Sensors of Vehicle>

The vehicle 90 includes various sensors. FIG. 1 shows a wheel speed sensor 81 and a brake sensor 82 as an example of various sensors. Detection signals from various sensors are input to the control device 10.

The wheel speed sensor 81 is an example of a sensor capable of acquiring the rotation angle of the wheel 91. The wheel speed sensor 81 is provided in each wheel 91. The detection signal from the wheel speed sensor 81 includes a pulse generated according to the rotation angle of the wheel 91.

Another example of the sensor capable of acquiring the rotation angle of the wheel 91 is a resolver of the electric motor which transmits power to drive wheels of the wheels 91. When the driving device of the vehicle 90 includes the electric motor, the rotation angle of the electric motor can be acquired based on the signal output from the resolver. If the rotation angle of the electric motor can be acquired, the rotation angle of the wheel 91 can be acquired.

The brake sensor 82 can detect the operation amount of the braking operation member 92. An example of the operation amount of the braking operation member 92 is a pedal stroke BP as the movement amount of the braking operation member 92. In addition, as the operation amount of the braking operation member 92, a pedal force corresponding to a pressure applied to the braking operation member 92 to operate the braking operation member 92 can be exemplified.

<Control Device>

The control device 10 can calculate the state quantity of the vehicle 90 based on the detection signals from various sensors. For example, the control device 10 can calculate the wheel speed corresponding to the rotation speed of the wheel 91 based on the detection signal from the wheel speed sensor 81. The control device 10 can calculate a vehicle body speed VS of the vehicle 90 based on the wheel speed. The control device 10 can calculate the pedal stroke BP as the operation amount of the braking operation member 92 based on the detection signal from the brake sensor 82.

The control device 10 includes a braking control unit 11, a first distance calculation unit 12, a second distance calculation unit 13, an abnormality determination unit 14, and a learning unit 15 as functional units.

The control device 10 may have any of the following configurations [a] to [c]. [a] One or more processors that execute various processes according to a computer program are provided. The processor includes a processing unit. As the processing unit, CPU, DSP, GPU, and the like can be exemplified. The processor includes a memory. The memory stores program code or instructions configured to cause the processing unit to execute processes. Examples of the memory include a RAM, a ROM, a flash memory, and the like. The memory, that is, a computer-readable medium includes any available media that can be accessed by a general purpose or special purpose computer. [b] One or more hardware circuits that execute various processes are provided. Examples of hardware circuits include ASIC (Application Specific Integrated Circuit), CPLD (Complex Programmable Logic Device) and FPGA (Field Programmable Gate Array). [c] A processor that executes a part of various processes according to a computer program and a hardware circuit that executes the rest of various processes are provided.

The braking control unit 11 can control the braking device 20. The braking control unit 11 can calculate a reference braking force based on the pedal stroke BP. The reference braking force in this case corresponds to the magnitude of the braking force requested by the driver of the vehicle 90. The braking control unit 11 can calculate a target braking force BFT based on the reference braking force. The target braking force BFT is used as a target value of the braking force applied to the vehicle 90 by controlling the braking device 20. The braking control unit 11 sets a braking profile as a transition of the target braking force BFT when the vehicle 90 is stopped. The braking profile will be described in detail later. The braking control unit 11 can apply the braking force to the vehicle 90 by controlling the braking device 20 based on the target braking force BFT.

The braking control unit 11 can calculate a distance moved until the vehicle 90 stops while the vehicle 90 is being braked. The distance moved until the vehicle 90 stops is a stop distance Ds. The calculation of the stop distance Ds will be described. The braking control unit 11 can calculate a reference acceleration as a value obtained by estimating the longitudinal acceleration of the vehicle 90 when it is assumed that the reference braking force is applied to the vehicle 90. The reference acceleration is a value which is calculated to become smaller as the reference braking force becomes smaller. The braking control unit 11 can estimate a position in which the vehicle 90 stops as a stop position based on the vehicle body speed VS and the reference acceleration while the vehicle 90 is being braked. The current position of the vehicle 90 at the time of estimation is set as a start position. The braking control unit 11 can calculate a distance from the start position to the stop position, that is, a distance moved until the vehicle 90 stops as the stop distance Ds.

The braking control unit 11 can execute feedback control while the vehicle 90 is being braked. The feedback control can adjust the braking force when the vehicle body speed VS is small. Hereinafter, the feedback control is sometimes referred to as the "F/B control". The execution conditions of the F/B control will be described. As an example, the braking control unit 11 determines that the execution conditions are established when the vehicle body speed VS is smaller than a specified threshold value. As the specified threshold value, a determination speed VSth for determining whether the vehicle body speed VS is very low can be adopted. The determination speed VSth is a value which is calculated and set in advance by experiments or the like. The determination speed VSth is set as a value at which deviation between the actual speed of the vehicle 90 and the vehicle body speed VS calculated based on the detection signal from the wheel speed sensor 81 is unlikely to occur when the vehicle body speed VS is equal to or higher than the determination speed VSth.

In the F/B control, the braking control unit 11 adjusts the braking force based on the moving distance of the vehicle 90 during braking. Although details will be described later, the braking control unit 11 increases or decreases the target braking force BFT so as to reduce the difference between the braking force reference distance and the wheel reference distance D. The braking force reference distance is the moving distance of the vehicle 90 estimated from the braking force applied to the vehicle 90. The wheel reference distance D is the moving distance of the vehicle 90 which can be estimated based on the distance in which the vehicle 90 moves whenever the wheel 91 rotates. The target braking force BFT after adjustment by the F/B control can be determined by the target braking force BFT before adjustment, an increase/decrease according to the difference, and an increase/decrease of a learning correction value described later.

The braking control unit 11 may execute a pre-stop brake control while the vehicle 90 is being braked. The pre-stop brake control can be executed immediately before the vehicle 90 is stopped. In the pre-stop brake control, the braking control unit 11 adjusts the target braking force BFT to increase or decrease with respect to the reference braking force corresponding to the pedal stroke BP. By the pre-stop brake control, it is possible to suppress the longitudinal acceleration fluctuation of the vehicle body and the change speed of the pitch angle when the vehicle 90 stops. The execution conditions of the pre-stop brake control will be described. As an example, the braking control unit 11 determines that the execution condition is established when the vehicle body speed VS becomes smaller than the pre-stop speed. The braking control unit 11 can determine that the execution conditions are not established when the target value of the longitudinal acceleration of the vehicle 90 is equal to or larger than a predetermined value toward the deceleration side even when the vehicle body speed VS is smaller than the pre-stop speed. An example of the pre-stop speed is the same value as the determination speed VSth in the F/B control. The pre-stop speed can adopt a value different from the determination speed VSth. The braking control unit 11 can execute the F/B control while the pre-stop brake control is being executed.

The first distance calculation unit 12 calculates an ideal distance transition Di used for the F/B control. The first distance calculation unit 12 calculates the ideal distance transition Di when the execution conditions of the F/B control are established. The ideal distance transition Di indicates a transition until the moving distance of the vehicle 90 reaches the stop distance Ds.

The calculation of the ideal distance transition Di by the first distance calculation unit 12 will be described. The first distance calculation unit 12 estimates the transition of the moving distance of the vehicle 90 over time when the braking force is applied according to the target braking force BFT and calculates the transition as the ideal distance transition Di. The value of the ideal distance transition Di at the start position is "0". The value of the ideal distance transition Di at the stop position is the stop distance Ds. A value at a certain time on the ideal distance transition Di indicates the distance between the position of the vehicle 90 and the start position at that time. The value of the ideal distance transition Di corresponds to the braking force reference distance that estimates the moving distance of the vehicle 90 until the vehicle 90 stops. In other words, the braking force reference distance is the moving distance of the vehicle 90 that can be estimated based on the longitudinal acceleration estimated when applying the braking force according to the target braking force BFT. Additionally, when the pre-stop brake control is executed, a braking profile is set as the transition of the target braking force BFT. That is, when the pre-stop brake control is executed, the first distance calculation unit 12 calculates the braking force reference distance as the moving distance of the vehicle 90 reflecting the adjustment of the braking force by the pre-stop brake control.

The first distance calculation unit 12 may set an allowable range for allowing the wheel reference distance D to deviate from the ideal distance transition Di when calculating the ideal distance transition Di. For example, the allowable range is set as the range from a lower limit value Dab to an upper limit value Daa. The first distance calculation unit 12 sets a value obtained by subtracting a lower width β from each value of the ideal distance transition Di as the lower limit value Dab. The first distance calculation unit 12 sets a value obtained by adding an upper width α to each value of the ideal distance transition Di as the upper limit value Daa. The lower width β and the upper width α may be the same value or different values. That is, the first distance calculation unit 12 can set an allowable range consisting of the upper limit value Daa and the lower limit value Dab that allows deviation from the braking force reference distance.

The second distance calculation unit 13 calculates the wheel reference distance D used for the F/B control. The second distance calculation unit 13 starts the calculation of the wheel reference distance D from when the execution conditions of the F/B control are established. The second distance calculation unit 13 repeats the calculation of the wheel reference distance D at a predetermined cycle until the vehicle 90 stops and updates the value. The second distance calculation unit 13 ends the calculation of the wheel reference distance D when the vehicle 90 stops.

The calculation of the wheel reference distance D by the second distance calculation unit 13 will be described. The second distance calculation unit 13 can acquire pulses output from the wheel speed sensor 81 as the wheel 91 rotates as information indicating the rotation angle of the wheel 91. The second distance calculation unit 13 can calculate the wheel reference distance D by using the diameter of the wheel 91 and the pulse acquired by the wheel speed sensor 81 in accordance with the rotation of the wheel 91. Specifically, the wheel reference distance D is obtained by calculating the moving distance per pulse and integrating the moving distance whenever a pulse is generated. The moving distance per pulse can be calculated from the relationship between the distance moved by the vehicle 90 as the wheel 91 rotates and the number of pulses generated while the wheel 91 rotates. The diameter of the wheel 91 is stored in, for example, the second distance calculation unit 13. Additionally, the second distance calculation unit 13 may store not only the diameter of the wheel 91 but also the length of the outer circumference of the wheel 91. Further, the second distance calculation unit 13 may store the moving distance per pulse. The second distance calculation unit 13 can calculate the wheel reference distance D by using the signal output from the resolver as the information indicating the rotation angle of the wheel 91.

The abnormality determination unit 14 can determine whether the wheel reference distance D exceeds the allowable range during the execution of the F/B control. The abnormality determination unit 14 determines that an abnormality has occurred when the wheel reference distance D has exceeded the allowable range. The abnormality determination unit 14 determines that no abnormality has occurred when the wheel reference distance D is in the allowable range.

The learning unit 15 can execute a learning process. The learning process is a process for suppressing the repetition of a situation in which the wheel reference distance D exceeds the allowable range. For example, in the learning process, the learning unit 15 can calculate a learning correction value for adjusting the target braking force BFT. The learning correction value is a value that corrects the target braking force BFT in order to suppress the repetition of similar excesses. For example, the learning correction value includes an amount for correcting the target braking force BFT and a timing for correcting the target braking force BFT. For example, when the wheel reference distance D exceeds the upper limit value Daa, the learning correction value is calculated by the learning unit 15 as a value for increasing the target braking force BFT. On the other hand, when the wheel reference distance D exceeds the lower limit value Dab, the learning correction value can be calculated by the learning unit 15 as a value for decreasing the target braking force BFT. The initial value of the learning correction value is "0".

The learning unit 15 can determine whether similar excesses occur repeatedly. The learning unit 15 may have a function of storing a situation in which the excess has occurred for use in the determination. When the abnormality determination unit 14 determines that an abnormality has occurred, the learning unit 15 can store the determination result as a history. For example, the learning unit 15 can store such as various state quantities and various control quantities of the vehicle 90 as an excess history when it is determined that an abnormality has occurred. The learning unit 15 can accumulate history until the excess history is initialized. For example, the learning unit 15 can initialize the excess history and delete the determination result when the operation switch of the vehicle 90 is turned off. The learning unit 15 can also retain the excess history without initializing the excess history even when the operation switch of the vehicle 90 is turned off. The learning unit 15 may return the learning correction value to the initial value when initializing the excess history.

<Braking Profile>

Figure 2:
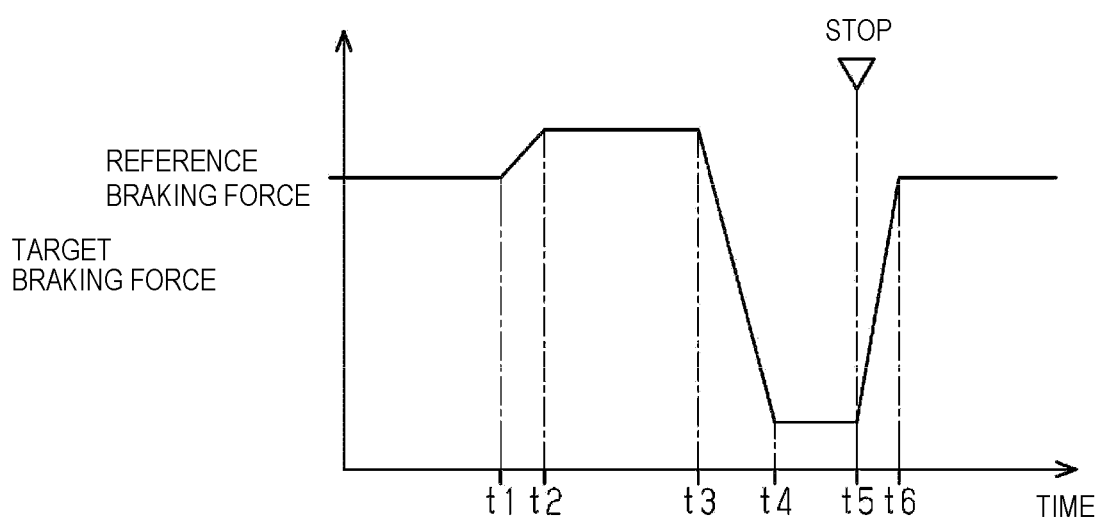
FIG. 2 is a diagram showing a braking profile set by the braking control device as transition of a target braking force when stopping the vehicle.

An outline of the braking profile in the pre-stop brake control will be described with reference to FIG. 2. FIG. 2 shows a braking profile as the transition of the target braking force BFT. In the example shown in FIG. 2, the timing t5 is when the vehicle 90 is stopped. Additionally, a state in which the rotation of the wheel 91 of the vehicle 90 is stopped is referred to as the stop state of the vehicle 90.

In the braking profile, a period from the timing t3 before the timing t5 to the timing t4 is a period during which the target braking force BFT is gradually decreased. In the braking profile, a period from the timing t4 to the timing t5 is a period for maintaining the target braking force BFT constant. Additionally, the decrease amount of the target braking force BFT per hour and the length of the period for maintaining the target braking force BFT constant are adjusted according to the vehicle body speed VS, the longitudinal acceleration AS, the stop distance Ds, and the like.

Further, as shown in FIG. 2, in the braking profile set by the braking control unit 11, the target braking force BFT increases after the timing t5. This is to keep the vehicle 90 in a stop state by suppressing the movement of the vehicle 90 after stopping. In the braking profile, a period from the timing t5 to the timing t6 is a period during which the target braking force BFT is increased to the reference braking force. After the timing t6 when the target braking force BFT reaches the reference braking force, the target braking force BFT is maintained at the reference braking force. Additionally, it is not essential that the increased target braking force BFT matches the reference braking force as after the timing t6.

Incidentally, when there is a period in which the target braking force BFT is reduced below the reference braking force during braking, the braking distance of the vehicle 90 may increase. Here, in the pre-stop brake control, the braking control unit 11 reduces the difference in braking distance compared to a case in which the target braking force BFT is not reduced even when the target braking force BFT is reduced immediately before the vehicle 90 stops. Specifically, the braking control unit 11 temporarily increases the target braking force BFT before the target braking force BFT starts to be reduced. In the profile set by the braking control unit 11, a period from the timing t1 before the timing t3 to the timing t2 is set as a period for gradually increasing the target braking force BFT. In the braking profile, a period from the timing t2 to the timing t3 is set as a period for maintaining the target braking force BFT constant. The braking control unit 11 calculates an increase amount and an increase period of the target braking force BFT in consideration of the fact that the braking distance is shortened by increasing the target braking force BFT from the reference braking force. Then, the braking control unit 11 reflects the increase amount and the increase period of the target braking force BFT in the setting of the braking profile.

During the execution of the pre-stop brake control, the braking control unit 11 changes the target braking force BFT according to the braking profile to adjust the control quantity of the braking device 20. Additionally, in the braking profile when the pre-stop brake control is not executed, the value of the reference braking force is set as the target braking force BFT.

<Process Executed by Control Device>

Figure 3:
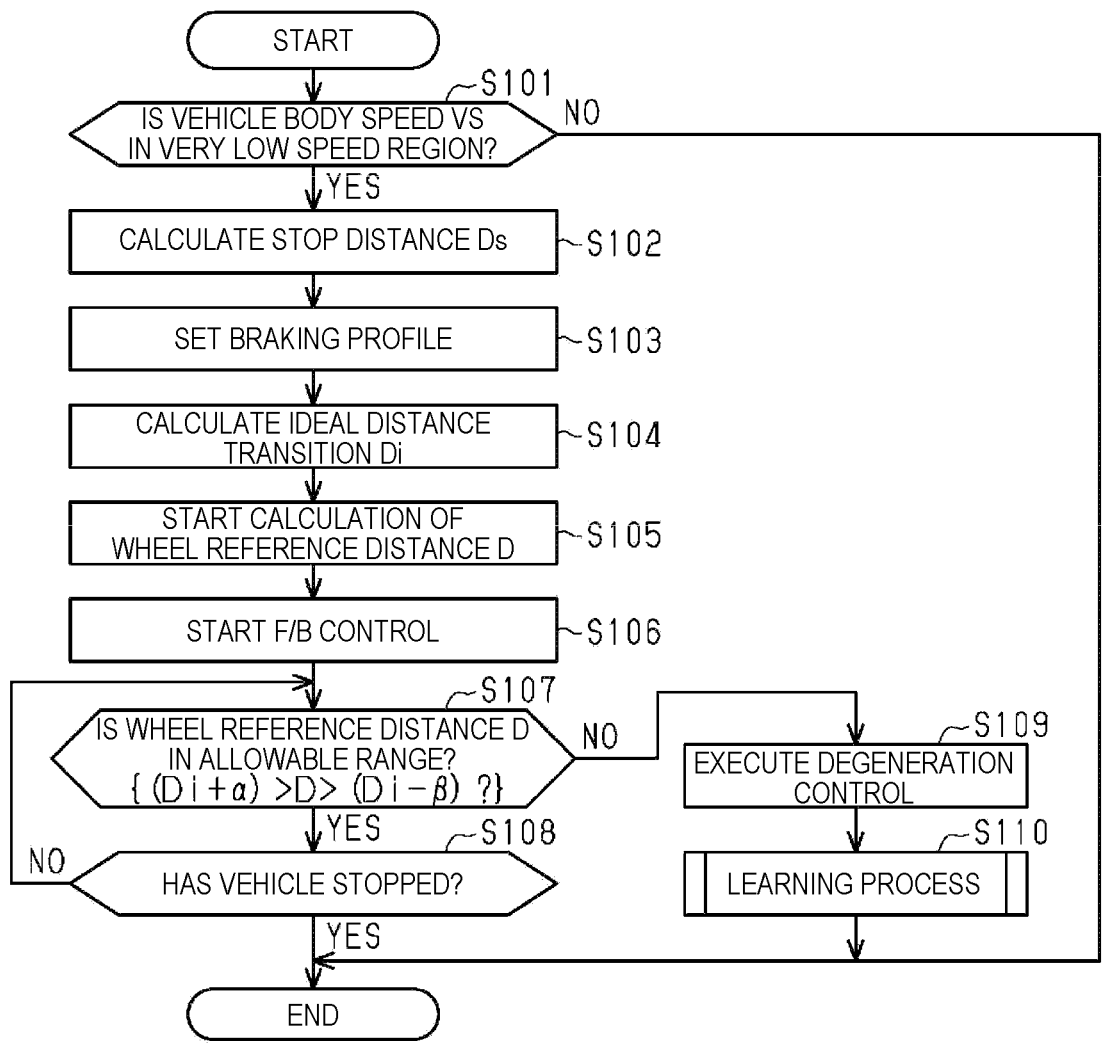
FIG. 3 is a flowchart showing a flow of a process executed by the braking control device during braking.

FIG. 3 shows a flow of a process executed by the control device 10. This process routine is started while the vehicle 90 is being braked. This process routine can be repeatedly executed at each predetermined cycle during braking.

When this process routine is started, first, in step S101, the control device 10 causes the braking control unit 11 to determine whether the vehicle body speed VS is in a very low speed region. The braking control unit 11 determines that the vehicle body speed VS is in a very low speed region when the vehicle body speed VS is smaller than the determination speed VSth. When the vehicle body speed VS is not in a very low speed region (S101: NO), the control device 10 once ends this process routine. On the other hand, when the vehicle body speed VS is in a very low speed region (S101: YES), the control device 10 shifts the process to step S102.

In step S102, the control device 10 causes the braking control unit 11 to calculate the stop distance Ds. The braking control unit 11 estimates the stop position of the vehicle 90 and calculates the stop distance Ds. Then, the control device 10 shifts the process to step S103.

In step S103, the control device 10 causes the braking control unit 11 to set the braking profile. The braking control unit 11 sets the braking profile in which the target braking force BFT is increased or decreased with respect to the reference braking force as shown in FIG. 2 when the execution conditions of the pre-stop brake control are established. On the other hand, when the execution conditions of the pre-stop brake control are not established, the braking control unit 11 sets the braking profile in which the value of the reference braking force is the target braking force BFT. When the braking profile is set, the control device 10 shifts the process to step S104.

In step S104, the control device 10 causes the first distance calculation unit 12 to calculate the ideal distance transition Di. The first distance calculation unit 12 estimates the longitudinal acceleration of the vehicle 90 based on the braking profile set in the process of step S103 and calculates the ideal distance transition Di and the allowable range. In other words, the first distance calculation unit 12 calculates the braking force reference distance. When the ideal distance transition Di is calculated, the control device 10 shifts the process to step S105.

In step S105, the control device 10 causes the second distance calculation unit 13 to start the calculation of the wheel reference distance D. The second distance calculation unit 13 calculates the wheel reference distance D by setting a value at the time of starting the calculation to "0" and integrating the moving distance per pulse whenever the pulse is detected. Then, the control device 10 shifts the process to step S106.

In step S106, the control device 10 causes the braking control unit 11 to start the F/B control. The braking control unit 11 increases or decreases the target braking force BFT set in the braking profile to decrease the difference between the braking force reference distance and the wheel reference distance D. As a result, the braking force applied to the vehicle 90 increases or decreases as the target braking force BFT increases or decreases. When the F/B control is started, the control device 10 shifts the process to step S107.

In step S107, the control device 10 causes the abnormality determination unit 14 to determine whether the wheel reference distance D is in the allowable range. The abnormality determination unit 14 determines that the wheel reference distance D is in the allowable range when the wheel reference distance D is larger than the lower limit value Dab and smaller than the upper limit value Daa. On the other hand, when the wheel reference distance D is equal to or smaller than the lower limit value Dab or the wheel reference distance D is equal to or larger than the upper limit value Daa, it is determined that the wheel reference distance D exceeds the allowable range.

In the process of step S107, when the wheel reference distance D is in the allowable range (S107: YES), the control device 10 shifts the process to step S108. In step S108, the control device 10 causes the braking control unit 11 to determine whether the vehicle 90 is stopped. For example, the braking control unit 11 can determine that the vehicle 90 has stopped when the wheel reference distance D has increased to the stop distance Ds.

When the vehicle 90 is stopped (S108: YES), the control device 10 ends this process routine. On the other hand, when the vehicle 90 is not stopped (S108: NO), the control device 10 shifts the process to step S107 again. That is, when the wheel reference distance D is in the allowable range until the vehicle 90 stops, the processes of step S107 and step S108 are repeatedly performed.

In the process of step S107, when the wheel reference distance D exceeds the allowable range, that is, when it is determined that an abnormality has occurred (S107: NO), the control device 10 shifts the process to step S109. In step S109, the control device 10 causes the braking control unit 11 to execute degeneration control. The degeneration control is control that matches the target braking force BFT with the reference braking force. That is, the braking control unit 11 ends the pre-stop brake control and the F/B control when the degeneration control is executed. The braking control unit 11 stops the vehicle 90 by controlling the braking device 20 based on the target braking force BFT set to the same value as that of the reference braking force. When the degeneration control is executed, the control device 10 shifts the process to step S110.

In step S110, the control device 10 causes the learning unit 15 to execute the learning process. Then, the control device 10 ends this process routine. The learning process will be described in detail with reference to FIG. 4.

<Learning Process>

Figure 4:
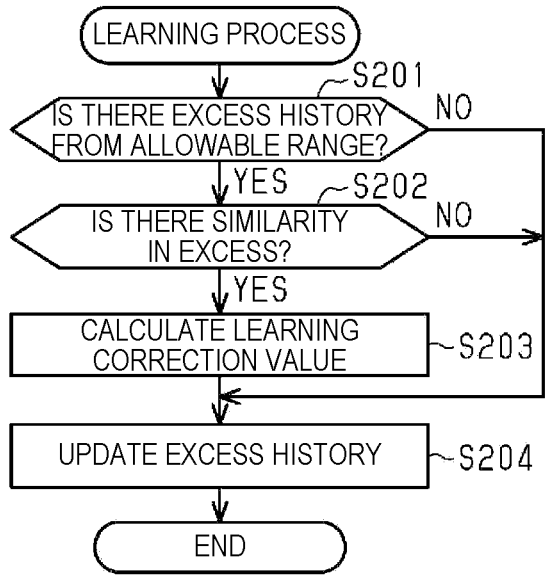
FIG. 4 is a flowchart showing a flow of a learning process executed by the braking control device.

FIG. 4 shows a process routine of the learning process executed by the learning unit 15. This process routine is started by the process of step S110 in FIG. 3. That is, the learning process is a process executed when the wheel reference distance D has exceeded the allowable range.

When this process routine is started, first, in step S201, the learning unit 15 determines whether there is a history in which the wheel reference distance D has exceeded the allowable range. That is, it is determined whether the wheel reference distance D has exceeded the allowable range before exceeding the allowable range at this time. When there is no excess history (S201: NO), the learning unit 15 shifts the process to step S204. In step S204, the learning unit 15 stores a current situation in which the wheel reference distance D exceeds the allowable range and updates an excess history. Then, the learning unit 15 ends this process routine.

On the other hand, when there is an excess history (S201: YES), the learning unit 15 shifts the process to step S202. In step S202, the learning unit 15 evaluates whether there is similarity between the current excess from the allowable range and the stored excess history.

An example of similarity evaluation will be described. For example, it is assumed that the wheel reference distance D exceeds the upper limit value Daa after the time Ti has elapsed from the start of the F/B control. The learning unit 15 refers to the excess history and evaluates that there is similarity when there are a specified number or more of histories in the elapsed time until the wheel reference distance D exceeds the upper limit value Daa is close to the time Ti. For example, the specified number of cases can be set to a value of two or more. The specified number of cases may be a value of one or more. Further, it is possible to evaluate that there is similarity, for example, when there are a specified number or more of histories in which the value of the target braking force BFT is close when the wheel reference distance D exceeds the allowable range. Further, it is also possible to evaluate the degree of similarity from a plurality of factors and evaluate that there is similarity when the degree of similarity exceeds a specified reference.

When there is no similarity in exceeding the allowable range (S202: NO), the learning unit 15 shifts the process to step S204. The learning unit 15 ends this process routine when the excess history is updated in step S204.

On the other hand, when there is similarity in exceeding the allowable range (S202: YES), the learning unit 15 shifts the process to step S203.

In step S203, the learning unit 15 calculates the learning correction value. As a result, the braking control unit 11 adjusts the target braking force BFT during the execution of the F/B control to a value reflecting the learning correction value. When the learning unit 15 calculates the learning correction value, the process is shifted to step S204. The learning unit 15 ends this process routine when the excess history is updated in step S204.

Operation and Effect

The operation and effect of this embodiment will be described.

Figure 5A:
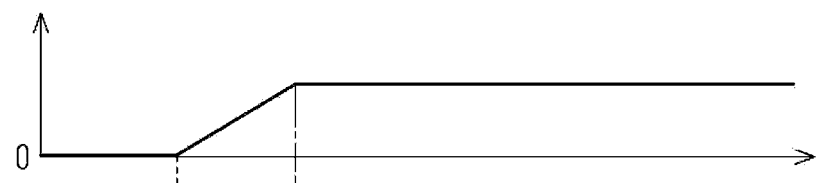
FIGS. 5A-5E are a timing chart showing a transition in braking force controlled by the braking control device.
Figure 5B:
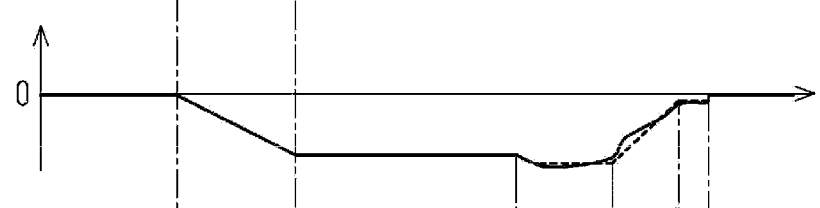
Figure 5C:
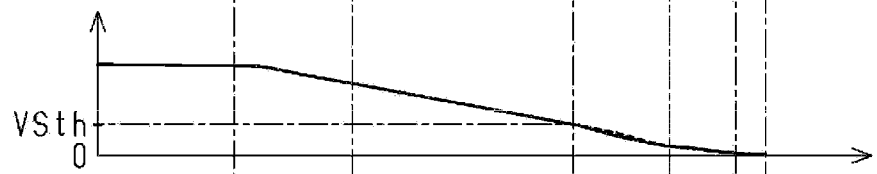

FIGS. 5A-5E shows a transition of the target braking force BFT when the vehicle 90 is stopped due to braking. In the example shown in FIGS. 5A-5E, as shown in FIG. 5A, the pedal stroke BP increases from the timing t11. After the timing t12, the pedal stroke BP is maintained constant. Since the braking force is applied as the pedal stroke BP increases, the longitudinal acceleration AS is a negative value during a period from the timing t11 to the timing t16 as shown in FIG. 5B. Further, the vehicle body speed VS decreases over time as shown in FIG. 5C as the braking force is applied. The vehicle body speed VS becomes smaller than the determination speed VSth after the timing t13. That is, in the example shown in FIGS. 5A-5E, the period before the timing t13 is a period in which deviation between the vehicle body speed VS and the actual speed of the vehicle 90 is unlikely to occur.

After the timing t13, the F/B control is executed since the vehicle body speed VS becomes smaller than the determination speed VSth (S106). Further, in the example shown in FIGS. 5A-5E, the execution conditions of the pre-stop brake control are established after the timing t13. That is, the pre-stop brake control is also executed after the timing t13. The example shown in FIGS. 5A-5E shows an example in which the vehicle 90 stops at the timing t16. That is, the position of the vehicle 90 at the timing t13 corresponds to the start position. The position of the vehicle 90 at the timing t16 corresponds to the stop position.

Figure 5D:
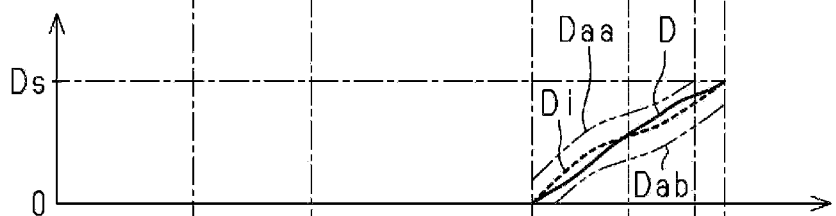
Figure 5E:
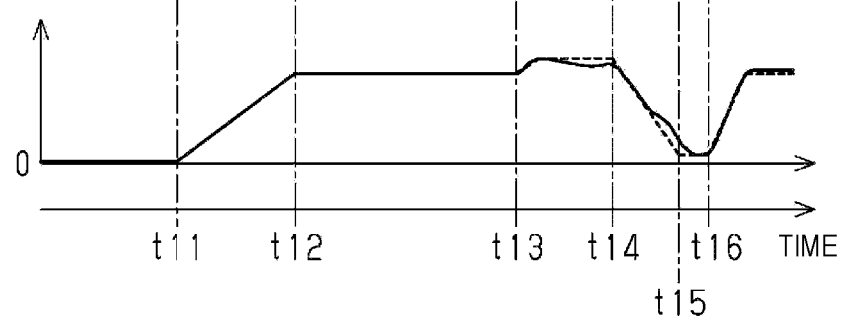

In FIG. 5E, the target braking force BFT is indicated by a solid line. Further, after the timing t13, the target braking force BFT when adjustment by F/B control is not executed is indicated by a dashed line. The target braking force BFT indicated by a dashed line is adjusted like the braking profile shown in FIG. 2 by executing the pre-stop brake control. The period from the timing t13 to the timing t14 is a period in which the target braking force BFT is increased from the reference braking force and a period in which the increased target braking force BFT is maintained. The period from the timing t14 to the timing t15 is a period in which the target braking force BFT is gradually decreased. The period from the timing t15 to the timing t16 is a period in which the target braking force BFT is maintained constant. The period after the timing t16 is a period in which the target braking force BFT is increased to the reference braking force.

According to the control device 10, the longitudinal acceleration AS immediately before the vehicle 90 stops can be brought closer to "0" as in the period from the timing t14 to the timing t16 shown in FIG. 5B by increasing or decreasing the target braking force BFT by the pre-stop brake control. Therefore, the change amount of the longitudinal acceleration AS when the vehicle 90 stops is suppressed to be small. Accordingly, it is possible to suppress the longitudinal acceleration fluctuation and the change speed of the pitch angle in the vehicle 90.

FIG. 5D shows a traveling distance in which the vehicle 90 moves from the start position to the stop position. A dashed line indicates the ideal distance transition Di. A two-dot chain line indicates the lower limit value Dab and the upper limit value Daa. That is, the inside of two two-dot chain lines indicates the allowable range. Further, in FIG. 5D, the wheel reference distance D is indicated by a solid line.

As shown in FIG. 5D, the ideal distance transition Di and the allowable range are calculated at the timing t13 when the F/B control is started (S104). The ideal distance transition Di is "0" at the time point of the timing t13. The ideal distance transition Di increases after the timing t13 and reaches the stop distance Ds at the time point of the timing t16. The ideal distance transition Di transitions in a curved line reflecting the braking profile adjusted by the pre-stop brake control. Similarly, after the timing t13 when the F/B control is started, the wheel reference distance D is calculated (S105). At the time point of the timing t13, the wheel reference distance D is "0".

According to the control device 10, when the wheel reference distance D deviates from the ideal distance transition Di as shown in FIGS. 5D and 5E by the execution of the F/B control, the target braking force BFT indicated by a solid line is adjusted by increasing or decreasing with respect to the value of the braking profile indicated by a dashed line. As a result, the braking force applied to the vehicle 90 is increased or decreased.

For example, when the road surface on which the vehicle 90 is traveling is downhill or uphill, the longitudinal acceleration of the vehicle 90 may be influenced depending on the inclination angle of the road surface. Due to the influence of such disturbance, the wheel reference distance D may deviate from the ideal distance transition Di. When the vehicle 90 continues to travel while the wheel reference distance D deviates from the ideal distance transition Di, the moving distance until the vehicle 90 stops may become shorter or longer than the stop distance Ds.

In this respect, according to the control device 10, it is possible to adjust the target braking force BFT to reduce the difference between the wheel reference distance D and the ideal distance transition Di by the F/B control. Accordingly, the moving distance until the vehicle 90 stops can be adjusted to the stop distance Ds. That is, the vehicle 90 can be stopped at a position calculated as the stop position.

A dashed line shown in FIG. 5B shows the transition of the longitudinal acceleration AS when it is assumed that the braking force is applied according to the braking profile by the pre-stop brake control. The value of the actual longitudinal acceleration AS indicated by a solid line has a different transition from a value indicated by a dashed line. This is because the braking force applied to the vehicle 90 is increased or decreased by the F/B control in addition to the pre-stop brake control.

A dashed line shown in FIG. 5C shows the transition of the vehicle body speed VS when it is assumed that the braking force is applied according to the braking profile by the pre-stop brake control as in the dashed line in FIG. 5B. The value of the actual vehicle body speed VS indicated by a solid line has a different transition from a value indicated by a dashed line. This is because the braking force applied to the vehicle 90 is increased or decreased by the F/B control in addition to the pre-stop brake control.

Additionally, in the example shown in FIGS. 5A-5E, the wheel reference distance D deviates from the ideal distance transition Di, but the wheel reference distance D does not exceed the allowable range. It is possible to reduce the difference between the wheel reference distance D and the ideal distance transition Di by the adjustment of the target braking force BFT using the F/B control.

According to the control device 10, it is possible to control the braking force applied to the vehicle 90 by estimating the moving distance of the vehicle 90 based on the detection signal from the wheel speed sensor 81. That is, it is possible to control the braking force without using the speed of the vehicle 90 calculated based on the detection signal from the wheel speed sensor 81. In the control device 10, the wheel reference distance D is calculated by integrating the moving distance whenever the pulse is generated using the moving distance per pulse. When the wheel reference distance D calculated in this way is compared with the speed, which is a value obtained by first-order differentiation of the rotation angle, and the acceleration, which is a value obtained by second-order differentiation of the rotation angle, the low accuracy of the actual value can be reduced. Therefore, even when the accuracy of detecting the vehicle speed is low, the influence on the accuracy of controlling the braking force can be reduced.

In the control device 10, when the vehicle body speed VS is smaller than the determination speed VSth, the F/B control is executed. The low accuracy of calculating the vehicle body speed VS can be compensated by executing the F/B control using the wheel reference distance D and the braking force reference distance in a region in which the accuracy of calculating the vehicle body speed VS is low.

It is conceivable that the distance moved by the vehicle 90 to the stop position is detected by a device such as a camera or radar. In this respect, the control device 10 is configured to calculate the wheel reference distance D by using the diameter of the wheel 91 and the pulse acquired by the wheel speed sensor 81 in accordance with the rotation of the wheel 91. Therefore, according to the control device 10, the distance moved by the vehicle 90 to the stop position can be calculated even when the vehicle 90 does not have a device such as a camera or radar. Further, even in the vehicle equipped with a camera, there is a concern that the distance moved by the vehicle to the stop position may not be detected when the camera is covered with snow or the like. According to the control device 10 that calculates the wheel reference distance D based on the pulse acquired from the wheel speed sensor 81, the distance moved by the vehicle 90 to the stop position can be calculated even in a situation in which a device such as a camera or radar cannot be used.

Figure 6A:
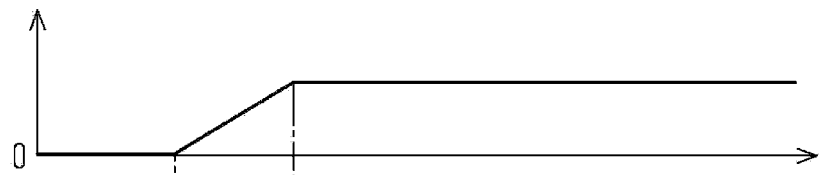
FIGS. 6A-6E are a timing chart showing a transition in braking force controlled by the braking control device when an abnormality has occurred.
Figure 6B:
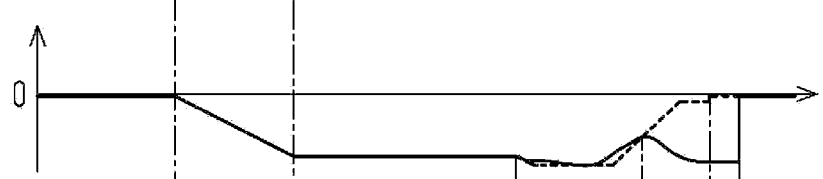
Figure 6C:
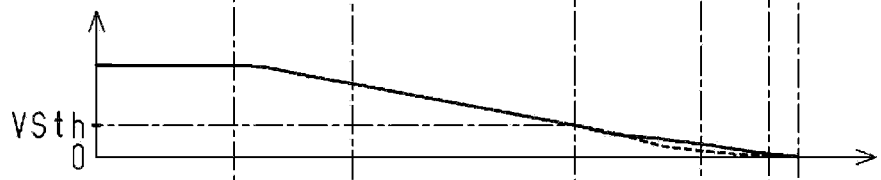

Next, an example of a case in which the wheel reference distance D exceeds the allowable range during the F/B control will be described with reference to FIGS. 6A-6E. As shown in FIG. 6A the pedal stroke BP increases from the timing t21. After the timing t22, the pedal stroke BP is maintained constant. As shown in FIG. 6B, the longitudinal acceleration AS has a negative value during a period from the timing t21 to the timing t26. Further, the vehicle body speed VS decreases over time as shown in FIG. 6C as the braking force is applied. The vehicle body speed VS becomes smaller than the determination speed VSth after the timing t23.

The feedback control is executed since the vehicle body speed VS becomes smaller than the determination speed VSth after the timing t23 (S106). Further, in the example shown in FIGS. 6A-6E, the pre-stop brake control is also executed after the timing t23. The example shown in FIGS. 6A-6E shows an example in which the vehicle 90 stops at the timing t26.

Figure 6D:
Figure 6E:
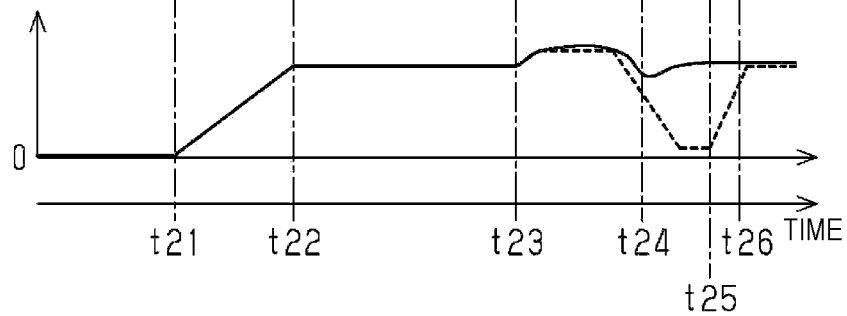

As shown in FIG. 6D, the ideal distance transition Di and the allowable range are calculated at the timing t23 when the F/B control is started (S104). The wheel reference distance D is calculated after the timing t23 when the F/B control is started (S105). The ideal distance transition Di increases after the timing t23 and reaches the stop distance Ds at the time point of the timing t25. That is, the braking profile in which the vehicle 90 reaches the stop position at the time point of the timing t25 is set.

At the timing t24, the wheel reference distance D exceeds the upper limit value Daa in the allowable range. Therefore, it is determined that an abnormality has occurred at the timing t24 (S107: NO) and the degeneration control is executed (S109). That is, the pre-stop brake control and the F/B control are ended after the timing t24. In the example of FIGS. 6A-6E, there is a period in which the target braking force BFT is decreased from the reference braking force as indicated by a dashed line of FIG. 6E at the time point of the timing t24. A decrease in the target braking force BFT is interrupted so that the target braking force BFT matches the reference braking force as indicated by a solid line by executing the degeneration control during this period.

According to the control device 10, it is possible to detect an abnormality when the wheel reference distance D has exceeded the allowable range. When the wheel reference distance D exceeds the upper limit value Daa as in the example shown in FIGS. 6A-6E, the vehicle 90 is too close to the stop position compared to a case in which the vehicle 90 travels according to the ideal distance transition Di. That is, there is a possibility that the braking force is insufficient. In the control device 10, when an abnormality occurs in this way, the target braking force BFT can be matched with the reference braking force by executing the degeneration control. Accordingly, the braking force required by the driver can be secured, and the shortage of braking force can be eliminated. Additionally, in the example of FIGS. 6A-6E, the vehicle 90 stops at the timing t26 beyond the timing t25 when the vehicle 90 stops in the ideal distance transition Di. At this time, the moving distance until the vehicle 90 stops becomes longer than the stop distance Ds as indicted by a solid line in FIG. 6D.

A dashed line shown in FIG. 6B shows the transition of the longitudinal acceleration AS when it is assumed that the braking force is applied according to the braking profile by the pre-stop brake control. The value of the actual longitudinal acceleration AS indicated by a solid line differs greatly from the value indicated by a dashed line after the timing t24 when the degeneration control is executed. Since the pre-stop brake control has ended, the longitudinal acceleration AS immediately before the vehicle 90 stops does not approach "0".

A dashed line shown in FIG. 6C shows the transition of the vehicle body speed VS when it is assumed that the braking force is applied according to the braking profile by the pre-stop brake control as in the dashed line of FIG. 6B. The value of the actual vehicle body speed VS indicated by a solid line has a different transition from a value indicated by a dashed line.

Additionally, in the control device 10, it is possible to detect an abnormality in which the wheel reference distance D exceeds the lower limit value Dab of the allowable range. When the wheel reference distance D exceeds the lower limit value Dab, the distance to the stop position is long compared to a case in which the vehicle 90 travels according to the ideal distance transition Di. That is, there is a possibility that the braking force may be excessive. A situation in which the braking force is excessive occurs, for example, during a period in which the target braking force BFT is increased from the reference braking force as in the period from the timing t1 to the timing t3 in FIG. 2. In the control device 10, the degeneration control can be executed even when an abnormality occurs in this way. It is possible to reduce the excessively applied braking force by matching the target braking force BFT with the reference braking force when executing the degeneration control.

In the control device 10, when the wheel reference distance D has exceeded the allowable range, the learning process can be executed (S110). Accordingly, it is possible to store the history in which the wheel reference distance D exceeds the allowable range (S204). Further, when similar excesses occur repeatedly, a learning correction value can be calculated (S203).

When similar excesses occur repeatedly, there is a concern that the cause of deviation of the wheel reference distance D from the ideal distance transition Di is not the disturbance. For example, there is a concern that the deviation is caused by other influences, such as an abnormality occurring in the braking device 20 and a difference between the target braking force BFT and the actually generated braking force. In such a case, it is possible to suppress the repetition of similar excesses by using the learning correction value in the F/B control. That is, according to the learning process, it is possible to suppress the wheel reference distance D from exceeding the allowable range due to factors other than disturbance.

Next, an example in which the F/B control is executed when the execution conditions of the pre-stop brake control are not established will be described with reference to FIGS. 7A-7E.

Figure 7A:
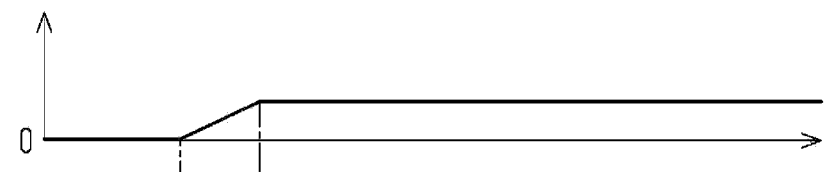
FIGS. 7A-7E are a timing chart showing a transition in braking force controlled by the braking control device when pre-stop brake control is not executed.
Figure 7B:
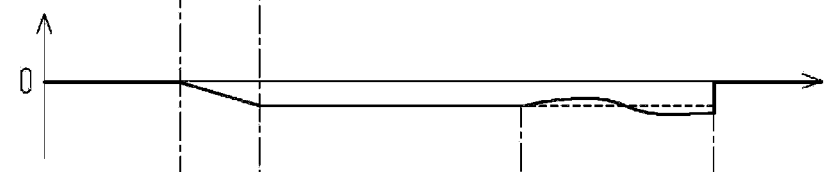
Figure 7C:
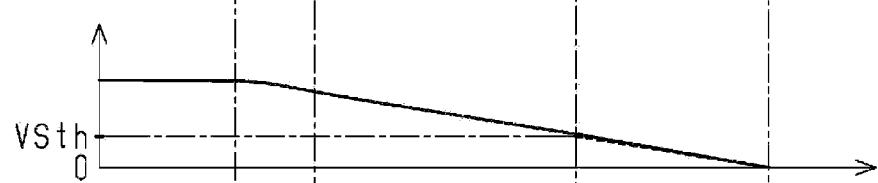

In the example shown in FIGS. 7A-7E, as shown in FIG. 7A, the pedal stroke BP increases from the timing t31. After the timing t32, the pedal stroke BP is maintained constant. Since the braking force is applied as the pedal stroke BP increases, the longitudinal acceleration AS is a negative value during the period from the timing t31 to the timing t34 as shown in FIG. 7B. Further, the vehicle body speed VS decreases over time as shown in FIG. 7C as the braking force is applied. The vehicle body speed VS becomes smaller than the determination speed VSth after the timing t33.

Figure 7D:
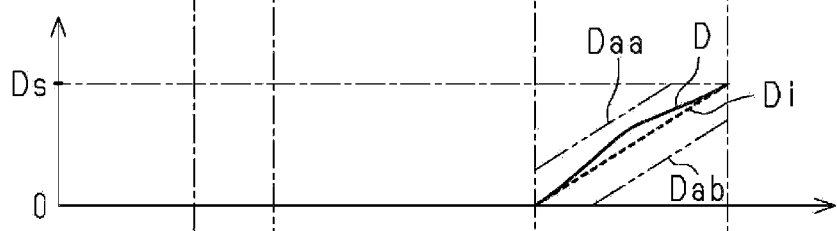
Figure 7E:
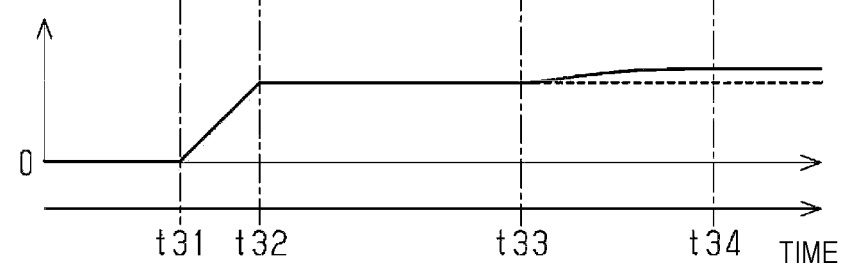

In FIG. 7E, the target braking force BFT is indicated by a solid line. Further, a dashed line indicates the target braking force BFT when the adjustment by the F/B control is not executed after the timing t33. In the example shown in FIGS. 7A-7E, since the pre-stop brake control is not executed, the value of the reference braking force is used for the target braking force BFT indicated by a dashed line.

The F/B control is executed since the vehicle body speed VS becomes smaller than the determination speed VSth after the timing t33. The example shown in FIGS. 7A-7E shows an example in which the vehicle 90 stops at the timing t34. That is, the position of the vehicle 90 at the timing t33 corresponds to the start position. The position of the vehicle 90 at the timing t34 corresponds to the stop position.

In FIG. 7D, the ideal distance transition Di is indicated by a dashed line. A two-dot chain line indicates the lower limit value Dab and the upper limit value Daa. That is, the inside of two two-dot chain lines indicates the allowable range. Further, in FIG. 7D, the wheel reference distance D is indicated by a solid line.

As shown in FIG. 7D, the ideal distance transition Di is "0" at the time point of the timing t33 when the F/B control is started. The ideal distance transition Di increases after the timing t33 and reaches the stop distance Ds at the time point of the timing t34. The ideal distance transition Di transitions as a straight line with a constant slope since the pedal stroke BP is constant. Further, the wheel reference distance D is "0" at the time point of the timing t33 when the F/B control is started.

According to the control device 10, when the wheel reference distance D deviates from the ideal distance transition Di as shown in FIGS. 7D and 7E by the execution of the F/B control, the target braking force BFT indicated by a solid line is adjusted by increasing or decreasing with respect to the value of the braking profile indicated by a dashed line. As a result, the braking force applied to the vehicle 90 is increased or decreased.

In the example shown in FIGS. 7A-7E, the wheel reference distance D becomes a value larger than the ideal distance transition Di. This is a situation in which the longitudinal acceleration of the vehicle 90 increases toward the positive value side, for example, since the road surface on which the vehicle 90 is traveling is downhill. Here, there is a concern that the vehicle 90 may exceed the stop position when it is assumed that the F/B control is not executed.

In this respect, according to the control device 10, it is possible to adjust the target braking force BFT to reduce the difference between the wheel reference distance D and the ideal distance transition Di by the F/B control. Specifically, in the example shown in FIGS. 7A-7E, as shown in FIG. 7E, the target braking force BFT indicated by a solid line is made larger than the reference braking force indicated by a dashed line. Accordingly, the moving distance until the vehicle 90 stops can be adjusted to the stop distance Ds. That is, the vehicle 90 can be stopped at a position calculated as the stop position. In this way, the control device 10 can execute the F/B control even when the pre-stop brake control is not executed.

MODIFIED EXAMPLE

This embodiment can be implemented with the following modifications. This embodiment and the following modified example can be implemented in combination with each other within a technically consistent range.

In the process of step S109 of the above-described embodiment, an example of executing the degeneration control when the wheel reference distance D has exceeded the allowable range, that is, when it is determined that an abnormality has occurred has been described. The control to be executed when an abnormality has occurred is not limited thereto. For example, when an abnormality has occurred, the braking force may be increased from the value before the occurrence of the abnormality. Further, it is conceivable to reduce the braking force, for example, in a situation in which the wheel reference distance D exceeds the allowable range due to the locking of the rotation of the wheel 91.

In the above-described embodiment, an example of executing the pre-stop brake control and the F/B control when the vehicle body speed VS is smaller than the determination speed VSth, that is, the vehicle body speed VS is in a very low speed region is shown. The F/B control is not limited to the pre-stop brake control and can be executed together with the control executed when the vehicle body speed VS is in a very low speed region.

The F/B control may be executed when the vehicle body speed VS is equal to or higher than the determination speed VSth. That is, the target braking force BFT may be adjusted so that the difference between the wheel reference distance D and the braking force reference distance decreases even when the vehicle body speed VS is equal to or higher than the determination speed VSth.

In the above-described embodiment, an example of calculating the reference braking force based on the pedal stroke BP, that is, the operation amount of the braking operation member 92 has been described. That is, a case in which the vehicle 90 is braked by the operation of the driver has been described. The processes shown in FIGS. 3 and 4 can also be executed when the vehicle 90 is under automatic operation control. When automatic driving is being executed, the reference braking force can be calculated by the automatic driving control device. Further, in this case, the automatic driving control device may calculate the target braking force and the braking profile.

In the above-described embodiment, the learning process is executed when the wheel reference distance D has exceeded the allowable range. It is not essential to execute the learning process when an abnormality has occurred.

In the above-described embodiment, an example of calculating the learning correction value as the learning process is shown. As the learning process, learning may be executed such that the F/B control is prohibited in situations in which similar excesses are repeated.

The invention claimed is:

1. A braking control device for a vehicle applied to a vehicle with a sensor capable of acquiring a rotation angle of a wheel, comprising:
a first distance calculation unit which sets a braking force corresponding to an operation amount of a braking operation member by a driver of the vehicle as a reference braking force, uses a longitudinal acceleration of the vehicle estimated to decrease as the reference braking force decreases, and calculates a braking force reference distance estimating a moving distance of the vehicle until the vehicle stops based on the longitudinal acceleration;
a second distance calculation unit which calculates a wheel reference distance estimating the moving distance of the vehicle based on a detection signal of the sensor and a diameter of the wheel; and
a braking control unit which executes feedback control of controlling the braking force applied to the vehicle so that a difference between the braking force reference distance and the wheel reference distance decreases,
wherein the braking control unit executes the feedback control when the speed of the vehicle is smaller than a specified threshold value,
wherein the first distance calculation unit sets an allowable range consisting of an upper limit value and a lower limit value that allow deviation from the braking force reference distance, and
wherein the braking control device for a vehicle further comprises an abnormality determination unit which determines that an abnormality has occurred when the wheel reference distance has exceeded the allowable range during the execution of the feedback control.

2. The braking control device for a vehicle according to claim 1,
wherein the braking control unit increases the braking force applied to the vehicle by ending the feedback control when the abnormality determination unit determines that an abnormality has occurred.

3. The braking control device for a vehicle according to claim 1,
wherein the braking control unit is configured to adjust the braking force applied to the vehicle with respect to the reference braking force and execute pre-stop brake control of suppressing a longitudinal acceleration fluctuation of a vehicle body and a change speed of a pitch angle in the vehicle and is able to execute the feedback control during the execution of the pre-stop brake control,
wherein the first distance calculation unit calculates the braking force reference distance as the moving distance of the vehicle that reflects the adjustment of the braking force by the pre-stop brake control when the pre-stop brake control is executed, and
wherein when the abnormality determination unit determines that an abnormality has occurred during the execution of the pre-stop brake control, the braking control unit ends the pre-stop brake control and the feedback control and controls the braking force applied to the vehicle based on the reference braking force.

4. A braking control device for a vehicle applied to a vehicle with a sensor capable of acquiring a rotation angle of a wheel, comprising:
a first distance calculation unit which sets a braking force corresponding to an operation amount of a braking operation member by a driver of the vehicle as a reference braking force, uses a longitudinal acceleration of the vehicle estimated to decrease as the reference braking force decreases, and calculates a braking force reference distance estimating a moving distance of the vehicle until the vehicle stops based on the longitudinal acceleration;
a second distance calculation unit which calculates a wheel reference distance estimating the moving distance of the vehicle based on a detection signal of the sensor and a diameter of the wheel; and
a braking control unit which executes feedback control of controlling the braking force applied to the vehicle so that a difference between the braking force reference distance and the wheel reference distance decreases,
wherein the first distance calculation unit sets an allowable range consisting of an upper limit value and a lower limit value that allow deviation from the braking force reference distance, and
wherein the braking control device for a vehicle further comprises an abnormality determination unit which determines that an abnormality has occurred when the wheel reference distance has exceeded the allowable range during the execution of the feedback control.

5. The braking control device for a vehicle according to claim 4,
wherein the braking control unit increases the braking force applied to the vehicle by ending the feedback control when the abnormality determination unit determines that an abnormality has occurred.

6. The braking control device for a vehicle according to claim 4,
wherein the braking control unit is configured to adjust the braking force applied to the vehicle with respect to the reference braking force and execute pre-stop brake control of suppressing a longitudinal acceleration fluctuation of a vehicle body and a change speed of a pitch angle in the vehicle and is able to execute the feedback control during the execution of the pre-stop brake control,
wherein the first distance calculation unit calculates the braking force reference distance as the moving distance of the vehicle that reflects the adjustment of the braking force by the pre-stop brake control when the pre-stop brake control is executed, and
wherein when the abnormality determination unit determines that an abnormality has occurred during the execution of the pre-stop brake control, the braking control unit ends the pre-stop brake control and the feedback control and controls the braking force applied to the vehicle based on the reference braking force.

7. A braking control device for a vehicle applied to a vehicle with a sensor capable of acquiring a rotation angle of a wheel, comprising:
a first distance calculation unit which sets a braking force corresponding to an operation amount of a braking operation member by a driver of the vehicle as a reference braking force, uses a longitudinal acceleration of the vehicle estimated to decrease as the reference braking force decreases, and calculates a braking force reference distance estimating a moving distance of the vehicle until the vehicle stops based on the longitudinal acceleration; and
a second distance calculation unit which calculates a wheel reference distance estimating the moving distance of the vehicle based on a detection signal of the sensor and a diameter of the wheel,
wherein the first distance calculation unit sets an allowable range consisting of an upper limit value and a lower limit value that allow the wheel reference distance to deviate from the braking force reference distance, and wherein the braking control device for a vehicle further comprises an abnormality determination unit which determines that an abnormality has occurred when the wheel reference distance has exceeded the allowable range.

* * * * *